Figure 3:
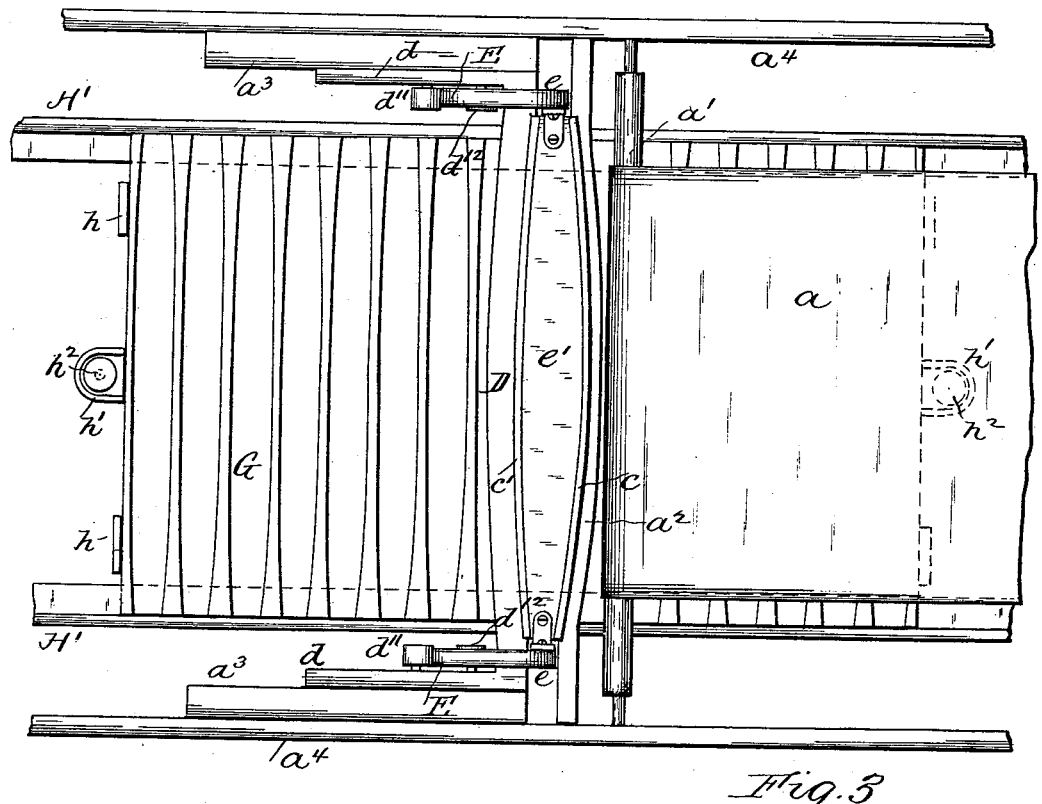

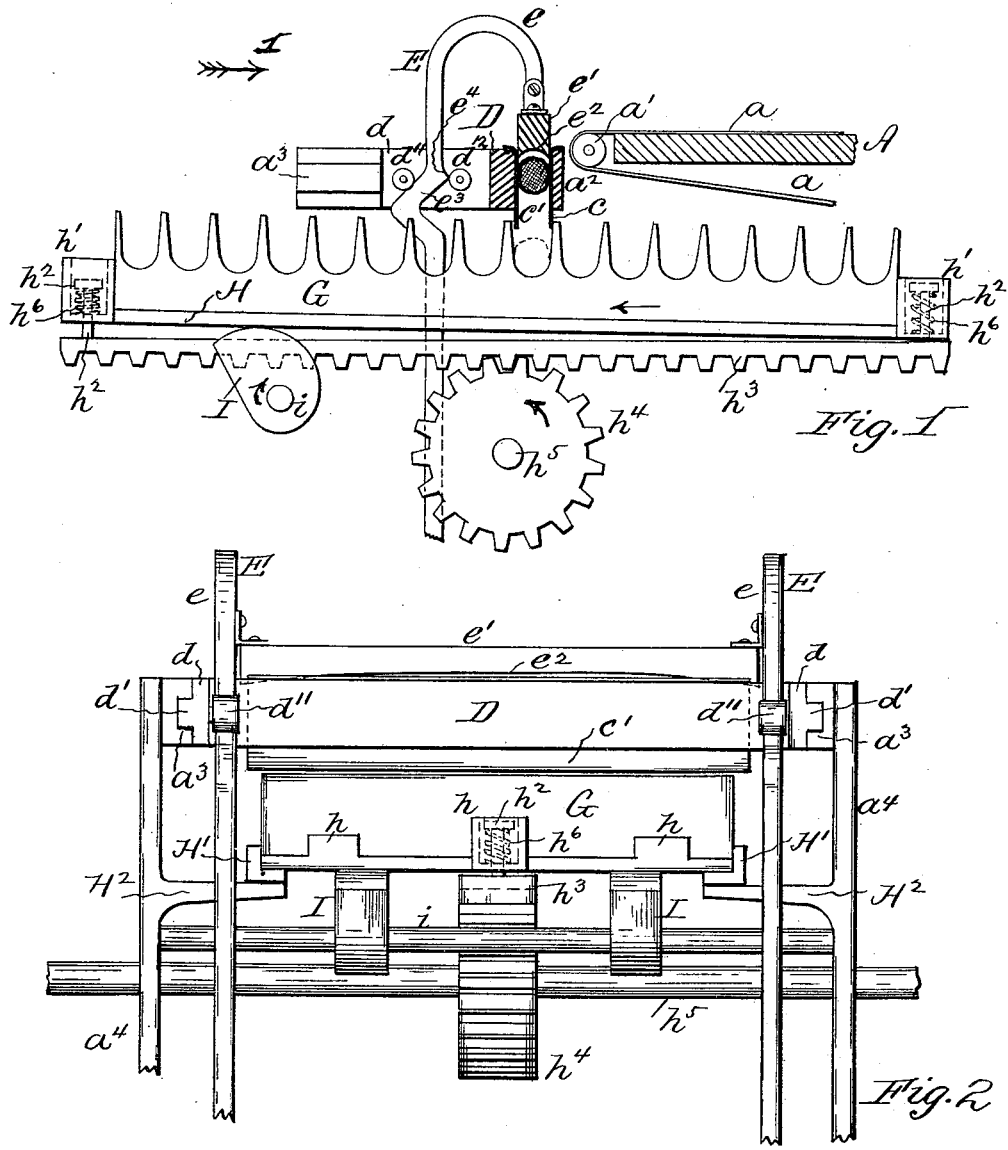

(No Model.) 3 Sheets—Sheet 2.

J. THOMPSON.
CIGAR MACHINE.

No. 405,724. Patented June 25, 1889.

WITNESSES:

INVENTOR,
John Thompson
By S. J. Van Stavoren
ATTORNEY (No Model.) 3 Sheets—Sheet 3.

J. THOMPSON.
CIGAR MACHINE.

No. 405,724. Patented June 25, 1889.

WITNESSES:
H. B. Hyatt.
A. J. Jones

INVENTOR
John Thompson
By S. J. Van Stavoren
ATTORNEY

UNITED STATES PATENT OFFICE.

JOHN THOMPSON, OF PHILADELPHIA, PENNSYLVANIA.

CIGAR-MACHINE.

SPECIFICATION forming part of Letters Patent No. 405,724, dated June 25, 1889.

Application filed October 29, 1888. Serial No. 289,474. (No model.)

*To all whom it may concern:*

Be it known that I, JOHN THOMPSON, a citizen of the United States, residing at Philadelphia, in the county of Philadelphia and State of Pennsylvania, have invented certain new and useful Improvements in Cigar-Machines, of which the following is a specification.

My invention has relation to cigar-making machines of the type having a bunch-forming device, a cigar-maker's or analogous mold-block for receiving the bunches, feeding mechanism for said mold-block, and devices between the bunch-forming devices and mold-block for conveying the bunches to and inserting or pressing them into the molds in the block. Heretofore said conveying devices between the bunch-former and mold-block have been so constructed and arranged relatively to the mold-block that a more or less number of the bunches, as they are successively conveyed to and inserted or compressed into the molds in the block, have their binders torn or impaired, or, owing to the fact that the terminal edges of the conveyer sides or flights do not always register with the edges of the molds as the mold-block is fed along, the bunches catch on such non-registering mold-edges as they are pushed into the mold by the compressing or inserting devices, and said bunches are then either mashed and cut by being pressed against said edges and rendered unfit for use or they cannot be forced into the mold, necessitating stopping the machine and withdrawing the mutilated bunch, which results in a loss of time and waste of material.

My invention has for its primary object to avoid these described objections by providing for the insertion of the terminal edges of the conveyer flights or sides into each successive mold after it is fed to the conveyer-flights, and thus positively make a continuous passage from the bunch-former to the bottom of each successive mold for the bunches to pass through, so that they cannot come into contact with the edges of the mold. To the accomplishment of this described end, the conveyer-flights may be moved toward the mold-block, or the latter may be moved toward the former. For purposes of my invention, however, I prefer to move the mold-block toward the conveyer-flights.

My invention has for its further object to make one of the conveyer flights or sides a plunger or compressing device, which acts in conjunction with and is operated by the plunger, which inserts the bunch in the mold, to compress the bunch between the conveyer flights or sides before it is pushed into the mold.

My invention accordingly consists of the combinations, constructions, and arrangements of parts, as hereinafter described in the specification, and pointed out in the claims.

Figure 4:
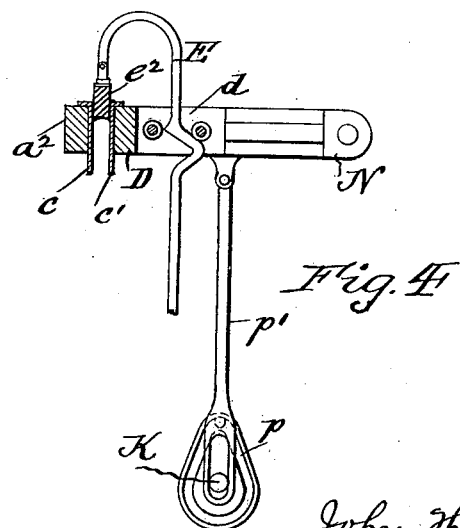
Figure 5:
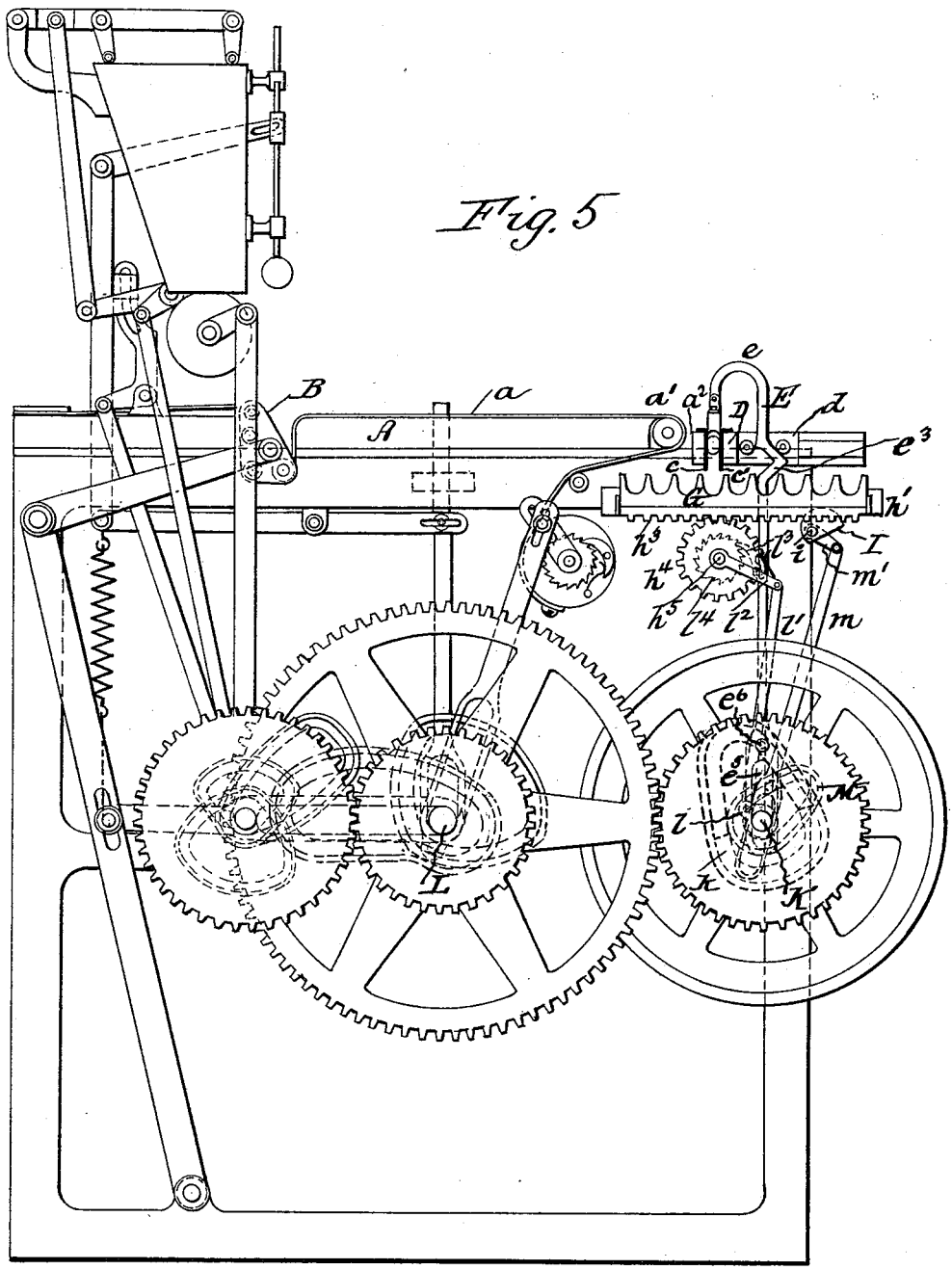

Reference being had to the accompanying drawings, Figure 1 represents a sectional elevation showing part or the rear end of a stationary bunch-forming plate, slack-belt thereon, conveyer flights or sides adjacent to the rear end of said forming-plate, one of said compressing flights or sides arranged to act as a compressing-plunger, engagement between the latter and another plunger for operating the former and for pushing the bunch through the conveyer-flights, a mold-block, feeding devices for the latter, and actuating-cam for tilting or moving the mold-block toward the conveyer-flights, the whole being represented detached from the machine. Fig. 2 is an elevation of Fig. 1, looking in the direction of arrow 1. Fig. 3 is a plan of same. Fig. 4 is a sectional elevation of a detail modification, showing a construction of conveyer flights or sides adapted to be moved toward the mold-block after its feeding movement is effected, to insert the terminal edges of said flights or sides into the molds in said block; and Fig. 5 is a side elevation of a cigar-forming machine embodying my improvements.

As the actuating or driving mechanism for the novel main features of my invention are a matter of detail, I will first proceed to describe such main novel features and their mode of operation without reference to said driving or actuating mechanism, which will be alluded to later on.

A represents the bunch-forming plate, which, in the drawings is represented as being stationary and having slack-belt $a$ and carriage B arranged for operation in a manner similar to that shown and described in United States Letters Patent granted to me November 30, 1886, and numbered 353,517; but any other suitable type of bunch-forming device may be substituted, as the same in itself forms no part of my present invention. Adjacent to the rear end $a'$ of the bunch-forming device are located conveyer flights or sides $c$ and $c'$, which may be of any suitable construction. In the drawings one of these flights or sides is shown secured to a cross-bar $a^2$, and is stationary. Its lower edge depends below the cross-bar $a^2$, and is preferably made of thin sheet metal, as indicated. It may be bowed or otherwise configured lengthwise to conform to the outline of a cigar, as more clearly shown in Fig. 3. The flight or side $c'$ is also of sheet metal correspondingly configured, having its lower edge in the same plane as that of the flight or side $c$. The side $c'$ is secured to a cross-bar D, having laterally or rearwardly projecting end lugs $d$, with ways $d'$, which loosely fit or enter guides $a^3$ in the housings $a^4 a^4$ of the machine, so as to admit of said bar D, with attached flight or side $c'$, moving toward and away from the fixed flight or side $c$ to serve as a compressing bar or plunger to compress the bunch between said flights or sides $c c'$ before it is projected or pushed through said flights or sides. On the lugs $d$ of bar D are located parallel rollers or trunnions $d^{11} d^{12}$, between which pass upright bars E E, which preferably have upper bent, bowed, or gooseneck ends $e$, united by a rod $e'$, having a concave under side $e^2$, and a configuration lengthwise approximating a cigar. The bars E E with cross-rod $e'$ form a plunger, which has an up-and-down motion to correspondingly move the plunger-rod $e'$ between the conveyer flights or sides $c c'$ to push the bunch through the latter.

The plunger-rod $e'$ may be of rubber or other elastic material, or, if desired, a rigid substance may be substituted.

The bars E E have or are formed with inclined or other suitably-shaped cams $e^3 e^3$, terminating in recessed ends $e^4 e^4$, so that as said bars are depressed the cams $e^3 e^3$, acting against the rollers $d^2$ on the lugs $d$ of bar D, push it and the conveyer flight or side $c'$ toward the stationary flight or side $c$ to compress the bunch between said sides or flights, as indicated in Fig. 1, at which time the plunger-rod $e'$ has just entered between said flights or sides. When the rollers $d^2$ pass off of the inclines or cams $e^3$ into the recesses $e^4$, the movable compressor flight or side $c'$ is slightly withdrawn from the stationary flight or side $c$ to release the pressure on the bunch and provide ample space between said flights or sides to permit the plunger-bar $e'$ to descend between the flights to the bunch or cigar and push it through the same without being subject to undue pressure from the plunger or compressor D. After this last-described result is effected, the plunger-rod $e'$ ascends, and in doing so the cams $e^3$ act upon the rollers $d^4$ on the lugs $d$ of bar D to reversely move the compressor conveyer-flight $c'$ to its normal distance away from the stationary flight, to be in position to receive the next bunch from the forming-table A.

G represents a cigar-maker's mold-block, which is preferably horizontally located beneath the table A and the conveyer-flights. It rests loosely upon a supporting-frame H, being held thereon against endwise movement by end lugs $h$ on said frame. The latter slides or moves in guides or ways H', secured to brackets H² on the housings $a^4$. The frame H is provided with end sockets $h'$, preferably located on its upper surface. In said sockets $h'$ are bolts $h^2$, which pass loosely through openings in the bottom of the sockets and are secured to the ends of a rack-bar $h^3$, resting on and engaging with the gear-wheel $h^4$ on shaft $h^5$. Surrounding the bolts $h^2$, between their heads and the bottom of the sockets, are contraction spiral or other springs $h^6$, which exert a downward pressure upon said bolts $h^2$, and in turn on the rack-bar $h^3$, to always maintain its engagement with the gear-wheel to effect the feeding movement for the plate H and mold-block G.

I represents lifting-cams, which are preferably located upon a separate shaft $i$, and are in contact with the lower side of plate H. Said cams are actuated to raise plate H, and consequently mold-block G, toward the conveyer flights or sides $c c'$, to cause their lower edges to enter the successive molds in the block G, as plainly indicated in Fig. 1.

The plunger-bars E at their lower ends are provided with elongated slots $e^5$, for the passage of a shaft K, and with trunnions or rollers $e^6$, for engagement with heart-shaped cams $k$, as shown, or other suitable cams secured to shaft K may be substituted which impart an up-and-down motion to said plunger-bars E and cause them to dwell at the termination of a full up-and-down movement. The shaft K is in gear with the driving-shaft L of the machine, as shown. Upon shaft K are other heart-shaped or suitable cams M, with which engage bars $m$, in a manner similar to that of the bars E with cams $k$, the other ends of bars $m$ being connected to a crank-lever $m'$ on shaft $i$, for intermittingly oscillating shaft $i$ to cause the cams I thereon to lift the plate H and mold G, as above described, the latter returning to their normal position by gravity.

At one end of shaft K, or otherwise located thereon, is a crank-arm $l$, which has a link-connection $l'$ with a lever $l^2$, loose on shaft $h^5$, which lever $l^2$ carries a spring-pawl $l^3$ for engaging a ratchet-wheel $l^4$ on shaft $h^5$ for imparting an intermittent rotary motion to shaft $h^5$, and gear-wheel $h^4$ thereon, to move rack-bar $h^3$ for effecting the intermittent feed of the plate H and mold-block G.

The operation is as follows: As a bunch from the table A is about to be delivered to the conveyer-flights $c\ c'$, the plunger-bars E E begin to descend, and their cams $e^3$ advance the movable flight $c'$ toward the fixed flight, so that as the bunch rolls off of the end of the table and falls between the conveyer-flights the movable flight $c'$ is in position to engage with the bunch and compress it, as illustrated in Fig. 1. Meanwhile the rollers $d^{12}$ having passed into the recesses $e^4$ on the bars E E, the movable conveyer-flight is slightly withdrawn to release the undue pressure on the compressed bunch, and the plunger-rod $e'$, as the bars E continue to descend, passes down between the conveyer-flights to push the bunch into a mold in block G, which meanwhile has been fed to the conveyer-flights by rotation of gear-wheel $h^4$, and raised or elevated by the cams I to cause the end of the conveyer-flights to enter the mold, the elevation of the mold being effected at the moment when the movable conveyer-flight $c'$ is fully compressing the bunch. As soon as the bunch is inserted into the mold the mold-block and its supporting-plate drop back into their position to release the conveyer-flights from the mold, the plunger-bars E E ascend and the movable conveyer-flight recedes, and in turn are moved, as above described, for the next bunch.

If desired, instead of raising and lowering the mold-block G toward and away from the conveyer-flights $c\ c'$, the latter may be moved to and from the mold-block, and to this end the fixed conveyer-flight $c$ and the movable flight $c'$ are secured to a frame N, pivoted to the housings $a^4$, the movements of which frame are controlled by a heart-shaped cam $p$ on shaft K and bar $p'$ in a manner similar for bars E E.

As it is obvious that the actuating mechanism for inserting the ends of the conveyer-flights into the molds of the mold-block, so as to alternately separate and join the conveyer-flights and mold-block, may be varied without departing from the spirit of my invention, I do not limit myself to the same as shown and described.

What I claim is—

1. The combination of the bunch-forming device, a mold-block, feed mechanism therefor, conveyer-flights, the ends of which enter the molds in said block to deliver the bunch, and mechanism for alternately separating and joining the molds and conveyer-flights, substantially as set forth.

2. In a cigar-making machine, the combination of a bunch-forming device, a mold-block, feeding mechanism therefor, conveyer-flights comprising a fixed and a movable flight between the bunch-forming device and the mold-block, the ends of the conveyer-flights entering the molds in said block to deliver the bunch, a plunger passing between said conveyer-flights, and mechanism for actuating said plunger and for alternately separating and joining the molds and conveyer-flights, substantially as set forth.

3. In combination with a cigar-bunch-forming device, the fixed and movable conveyer flights or sides $c\ c'$, a plunger passing between said flights and actuating said movable flight, a receiver or mold-block for the bunches, and actuating devices for engaging the ends of the flights or sides $c\ c'$ with the molds in the receiver or block, substantially as set forth.

4. In a cigar-machine, the combination of fixed and movable conveyer-flights $c\ c'$ and plunger-bars E, in engagement with and actuating the movable conveyer-flight $c'$, substantially as set forth.

5. In a cigar-machine, the combination of a mold-block, fixed and movable conveyer-flights $c\ c'$, the ends of which enter the molds in said block to deliver the bunch, a plunger passing between said flights, actuating mechanism for said plunger, and mechanism for feeding the mold-block and for alternately separating and joining the molds in said block and the conveyer-flights, substantially as set forth.

6. In a cigar-machine, the combination, with a bunch-forming device, of the fixed and movable conveyer-flights $c\ c'$, plunger-bars E, engaging with and controlling the movements of said movable conveyer-flights, a plate H, a rack-bar $h^3$, having spring-supports on said plate, a mold-block loosely supported on said plate, feeding mechanism for the plate, and actuating devices for raising said mold-block, substantially as set forth.

7. In a cigar-making machine, the combination of a bunch-forming device, the fixed conveyer-flight $c$, the movable conveyer-flight $c'$, having rollers $d^{11}\ d^{12}$, the plunger-rods E E, having cams $e^3$ and recesses $e^4$, and actuating mechanism for said plunger-rods, substantially as set forth.

8. In a cigar-making machine, the combination of plate H, having end lugs $h$, mold-block G, loose on said plate, guides or ways for said plate, rack-bar $h^3$, spring supported on plate H, and actuating mechanism in engagement with said rack-bar, and lifting-cams I in engagement with plate H, substantially as set forth.

In testimony whereof I affix my signature in presence of two witnesses.

JOHN THOMPSON.

Witnesses:
JOHN RODGERS,
S. J. VAN STAVOREN.